April 8, 1969     T. L. DEW     3,436,827
DENTAL MATRIX
Filed Feb. 24, 1967
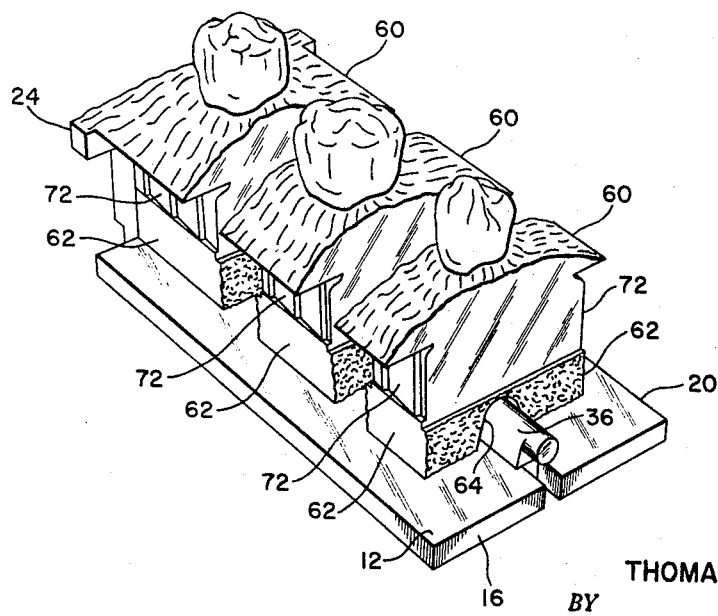
INVENTOR.
THOMAS L. DEW
BY
Samuelson & Jacob
ATTORNEY

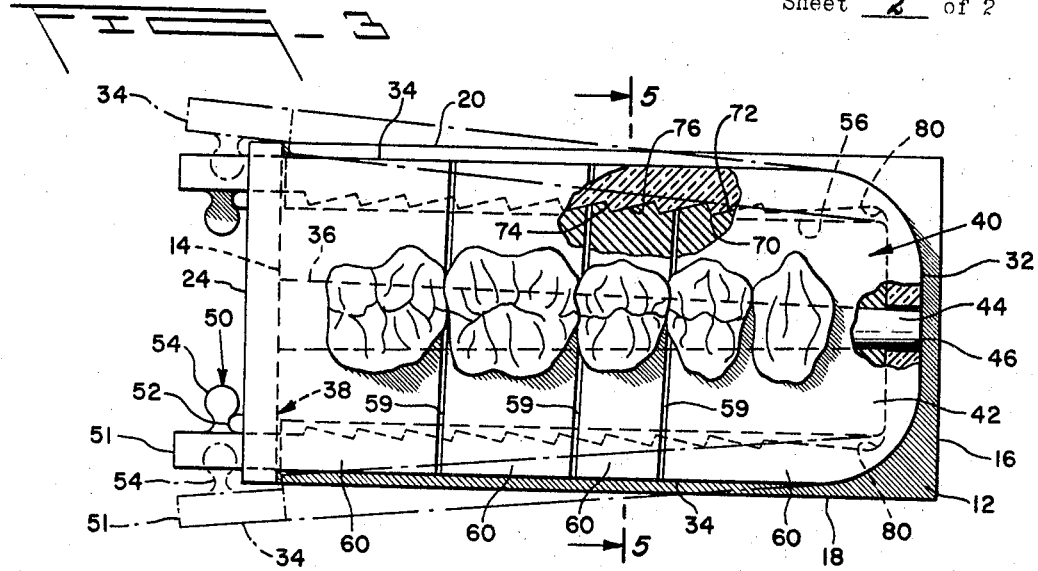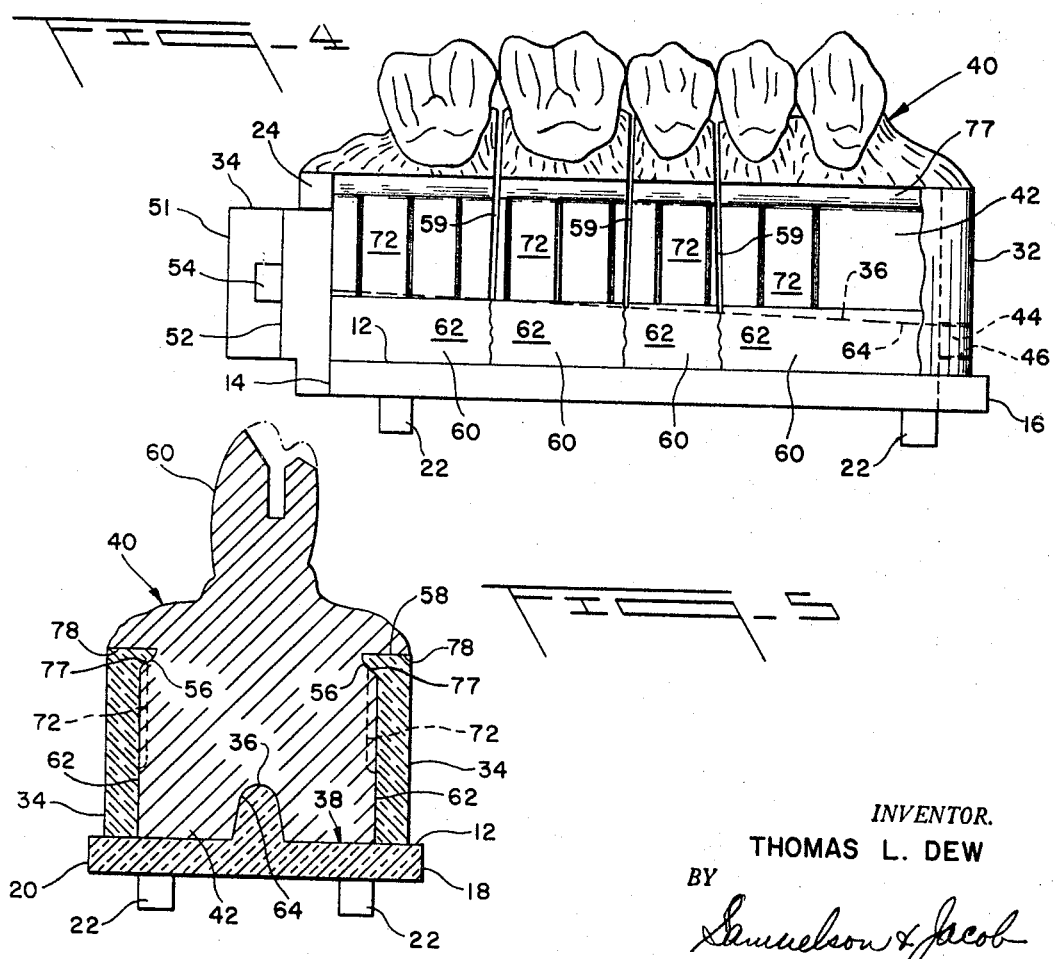

United States Patent Office 3,436,827
Patented Apr. 8, 1969

3,436,827
DENTAL MATRIX
Thomas L. Dew, 177 Merritt Drive,
Oradell, N.J. 07649
Filed Feb. 24, 1967, Ser. No. 618,397
Int. Cl. A61c 13/00
U.S. Cl. 32—11           8 Claims

ABSTRACT OF THE DISCLOSURE

A dental matrix for holding the segments of a segmented dental model or reproduction in accurate assembled relationship through the use of a base with an integral upstanding end wall, a longitudinal guide rail projecting upwardly from the base for coacting with the segments to locate and align the segments along the base and a U-shaped wall member detachably secured against the integral upstanding end wall and the base to establish a receptacle within which the segments are received and locked in place against both longitudinal and upward movement by ridges and ledges projecting laterally from the U-shaped wall member into the interior of the receptacle to engage and coact with the segments, any of the segments being selectively removable from the assembly by detachment and removal of the U-shaped wall member from the base and the integral upstanding end wall.

---

The invention relates generally to a dental matrix for use in holding a model or reproduction of at least a portion of a jaw in the fabrication of dental restorations and pertains more specifically to a dental matrix capable of accurately holding the segments of a segmented reproduction in assembled relationship and allowing selective release of any of the segments when desired.

In the fabrication of dental restorations from a model or reproduction of at least a portion of the jaw for which the restoration is made, it is often necessary to work upon only a segment of the reproduction, or a "die," which may represent only one tooth or a group of teeth rather than the entire jaw portion represented by the whole reproduction. In such instances it becomes important to have available a fixture or matrix capable of holding the segments of a reproduction which is divided into the desired segments or dies in assembled configuration, that is, with all of the segments or dies placed in accurate relationship with respect to one another, so that either the entire reproduction may be employed in a conventional manner in articulators and the like or any of the segments may be selectively removed from the matrix to be worked upon individually and then replaced to be retained again in accurate alignment with the remaining segments.

It is therefore an important object of the invention to provide a dental matrix which can hold the segments of a segmented reproduction of at least a portion of a jaw in accurate assembled relationship and which will allow individual segments to be selectively removed and subsequently replaced without disturbing the accuracy of the alignment of the segments in the assembled reproduction and without damaging the individual segments or the assembly.

Another object of the invention is to provide a dental matrix which is easy to use and which provides ease in the manipulation of segments or dies which are to be secured within the matrix.

Still another object of the invention is to provide a dental matrix which holds a segmented reproduction in such secure assembled relationship as to enable the reproduction to be employed in articulators and the like or in any other conventional operations for which such dental models are ordinarily employed.

A further object of the invention is to provide a dental matrix which has a simplified construction with a minimum number of component parts each having a configuration capable of economical fabrication so as to render the dental matrix so inexpensive as to be expendable.

A still further object of the invention is to provide a dental matrix which is economical enough to serve as an expendable package for shipping a segmented reproduction or model in assembled form and for storing the assembly when the assembly is not in use.

The above objects as well as further objects and advantages are attained in the invention which may be described briefly as a dental matrix for holding the segments of a segmented reproduction of at least a portion of the jaw in assembled relationship and permitting the selective release of any of the segments of the reproduction from the matrix for the fabrication of dental restorations, the matrix comprising a base extending longitudinally between opposite ends and laterally between opopsite sides, an end wall member extending upwardly from the base at one of the opposite ends, an upstanding guide rail extending longitudinally along the base between the opposite ends and projecting upwardly from the base intermediate the opposite sides for coacting with the segments to align the segments along the base, further wall elements including an upstanding lateral portion or element adjacent the other of the opposite ends of the base and upstanding opposite longitudinal portions or elements extending from the lateral portion or element toward the upwardly extending end wall member, securing means for releasably securing the lateral portion of the further wall means against the base member and the longitudinal portions against the upwardly extending end wall member to establish a receptacle within which the reproduction is held, the receptacle having an interior defined by the base, end wall member and further wall means, and locking means on interior portions of the further wall means for engaging and coacting with the reproduction to secure the segments thereof against both longitudinal and upward movement, each of the longitudinal portions of the further wall means being movable with respect to the lateral portion between a closed position wherein the longitudinal portions are secured against the end wall member by the securing means and the locking means engage and coact with the reproduction, and an open position wherein the securing means are released and the locking means are brought out of engagement with the reproduction to enable the removal of the further wall means from the base.

The invention will be more fully understood and still further objects and advantages will become apparent in the following detailed description of an embodiment of the invention illustrated in the drawing, in which:

FIGURE 1 is a perspective view illustrating the component parts of a disassembled dental matrix constructed in accordance with the invention;

FIGURE 2 is a view similar to FIGURE 1 but diagrammatically illustrating segments of a segmented reproduction lying along the base of the matrix;

FIGURE 3 is a plan view of the dental matrix shown assembled and with an entire segmented dental reproduction secured therein;

FIGURE 4 is an elevational view of the dental matrix illustrated in FIGURE 3 and partially cut away to show the dental reproduction seated therein; and FIGURE 5 is a cross-sectional view taken along line 5—5 of FIGURE 3.

Referring now to the drawing, and particularly to FIGURE 1, a dental matrix constructed in accordance with the invention is shown generally at 10 and is illustrated in a disassembled configuration so as to disclose the major component parts thereof. Dental matrix 10 is seen to have a generally planar horizontal base 12 which extends longitudinally between opposite ends 14 and 16 and extends laterally between opposite sides 18 and 20. The base is provided with four feet 22 (see FIGURES 4 and 5) which depend from the bottom of the base 12 and provide means by which the dental matrix 10 may rest upon any desired surface. An end wall member 24 is integral with the end 14 of the base and extends upwardly therefrom. Further wall elements are provided in the form of a unitary, U-shaped wall member 30 which has a lateral portion or element shown in the form of an upstanding end wall element 32 and a pair of longitudinal portions or elements shown in the form of side wall elements 34 extending longitudinally from end wall element 32 toward the upstanding end wall member 24. A guide rail 36 extends longitudinally along the base 12 between opposite ends 14 and 16 intermediate the opposite sides 18 and 20 thereof, is integral with the base and the end wall member 24 and projects upwardly from the base for purposes which will be explained below.

As best seen in FIGURES 3 through 5, the U-shaped member 30 is ordinarily assembled with and secured against the base 12 and the upstanding end wall member 24 to establish a receptacle 38 for receiving a model or reproduction 40 of at least a portion of a jaw, which reproduction is provided with a base member 42 having a configuration complementary to the configuration of the receptacle 38 established by the base 12, the upstanding end wall member 24 and the U-shaped member 30. Means are provided for detachably securing the U-shaped member 30 to the base 12 and are shown in the form of a protuberance 44 projecting longitudinally from the guide rail 36 and a longitudinally oriented aperture 46 corresponding to the location and configuration of the protuberance 44 so that the U-shaped member 30 may be placed upon the base 12 with the protuberance 44 inserted within the aperture 46 to secure the U-shaped member in place against the base. Further means are provided for releasably securing the side wall elements 34 of the U-shaped member 30 to the end wall member 24 and are shown in the form of detent means 50 adjacent the ends 51 of side wall elements 34 and including vertical ribs 52 projecting longitudinally from the end wall member 24 and coacting with resiliently deflectable protrusions 54 which are integral with the side wall elements and project laterally therefrom. When the U-shaped member 30 is properly located on the base 12 with protuberance 44 seated within aperture 46 and protrusions 54 cooperatively engaging ribs 52, the reproduction is firmly held by the dental matrix 10 within the receptacle thereof as will be more fully described below.

The reproduction 40 is fabricated with the aid of the dental matrix 10 as follows: The U-shaped member 30 is secured on the base 12 to establish the receptacle 38 as set forth above. The receptacle is then filled with dental stone, the dental stone rising to the level of ledges 56 which extend longitudinally along the side wall elements 34 of the U-shaped member 30 and project laterally into the receptacle thereby providing a platform 58 at the top of each side wall element. A dental impression (not shown) which has been constructed by employing any one of a number of conventional techniques is also filled with dental stone, inverted and placed over the mass of dental stone in the receptacle with some of the dental stone from the impression flowing over the platform 58 provided by the ledges 56 (see FIGURE 5). Upon hardening of the dental stone within the receptacle and within the impression, the impression is removed leaving behind the model or reproduction 40 with the integral base member 42 having a configuration complementary to the configuration of the receptacle 38. The U-shaped member 30 may then be removed from the base 12 by releasing the detent means 50 adjacent the ends 51 of the side wall elements 34, as shown in phantom in FIGURE 3, and then slipping the apertured end wall element 32 of the U-shaped member 30 from the protuberance 44, as seen in FIGURE 1, to expose the sides of the reproduction 40 and the base member 42. A plurality of saw cuts 59 may then be made in the exposed reproduction for the purpose of dividing the reproduction into a plurality of dies or segments 60, each representing either one tooth or a group of teeth so that when it becomes necessary to work upon any given tooth the segment 60 carrying that tooth may be removed from the matrix 10 and may be handled without the necessity of handling the entire reproduction 40. Thus, the saw cuts 59 are located between the segments 60 and extend from the top of the reproduction down to approximately the top of the guide rail 36. After the saw cuts are made, the segments 60 which are now defined by the saw cuts 59 still remain integral with one another in the reproduction by virtue of the unsevered portions of the base member 42 lying between the bottom of the saw cuts 59 and the bottom of the base member 42. Thus, the entire reproduction 40 may be lifted vertically from the base 12 as a whole and the individual segments 60 may be broken from one another by snapping those portions of the base member 42 which hold the segments together to sever the segments from one another.

After breaking the reproduction 40 into the segments 60 it is essential that the segments be capable of reassembly in accurate alignment so that the entire reproduction may be employed as a whole as if the segments were never formed. The dental matrix 10 provides means for assuring such accurate alignment upon reassembly of the segments 60. Thus, the longitudinal guide rail 36 is tapered from a larger cross-sectional area adjacent one opposite end 14 of base 12 to a smaller cross-sectional area adjacent the other opposite end 16 of the base so that each segment 60 will be properly seated upon the base 12 only when the segment is laterally aligned and longitudinally located in its predetermined position along the guide rail 36. Hence, guide rail 36 assures precision alignment and location of each of the segments 60 independent of the presence of the U-shaped member 30. Since U-shaped member 30 need not be present during the manipulation of segments 60 in the longitudinal direction along the guide rail 36, the segments 60 may be manipulated readily by grasping both sides 62 thereof, which sides are exposed as seen in FIGURE 2.

When it is desired to secure the segments 60 together in an accurate assembled configuration so that the reproduction may be manipulated as a whole, the U-shaped member 30 is secured in place upon the base 12, as seen in FIGURES 3 through 5, and the plurality of segments 60 are locked in their desired relative positions by locking means shown in the form of ridges 70 projecting laterally from the side wall elements 34 of the U-shaped member 30 into the interior of the receptacle 38 and cooperatively engaging complementary grooves 72 in the base member 42 of the reproduction 40. It is noted that each of the ridges 70 is provided with a configuration which includes a forward face 74 and a rearward face 76. The forward face 74 lies at a relatively steep angle to the longitudinal direction while the rearward face lies at a relatively shallow angle. Thus, in affixing the U-shaped member upon the base 12 the protuberance 44 is first located within the entrance of aperture 46 and as the side wall elements 34 of the U-shaped member are moved from their open position (shown in phantom in FIGURE 3), where the detent means 50 are not yet engaged, to a closed position (shown in full lines in FIGURE 3), where the detent means 50 lock the side wall elements 34 to the upstanding end wall member 24, the ridges 70 will slide into the corresponding complementary grooves 72 in the segments 60 and as the protrusions 54 of the detent means 50 engage the vertical ribs 52 the U-shaped member 30 will be drawn forward to fully engage the detent means 50, and the forward faces 74 of the ridges 70 will engage the corresponding faces of the complementary grooves 72 to draw all of the segments longitudinally toward the upstanding end wall 24 and take up any looseness which may be present between adjacent segments and thus assure that every segment is locked tightly in its predetermined accurate location. As best seen in FIGURE 5, once the side wall elements 34 of the U-shaped member 30 are in their closed position, the ledges 56 are each received within a complementary channel 77 in the base member 42 of the reproduction 40 and each segment is provided with a flat surface 78 at each side thereof which flat surfaces 78 each rest upon the platform 58 provided by the ledges 56 thereby reducing any tendency for the individual segments 60 to rock back and forth while held within the dental matrix 10. Thus, both the ridges 70 and the ledges 56 engage and coact with the reproduction 40 to preclude movement of the segments and firmly secure the reproduction within the dental matrix 10.

When it is desired to remove any one segment 60, the U-shaped member 30 may be removed from the base 12 by releasing the detent means 50 adjacent the ends 51 of the side wall elements 34, as shown in phantom in FIGURE 3, and the apertured end wall element 32 of the U-shaped member 30 may be slipped from the protuberance 44 as before. The segments 60 may then be manipulated readily by grasping both sides 62 thereof and may be displaced longitudinally along the guide rail 36. Upon such longitudinal displacement, the segments will be completely disengaged from one another, as seen in FIGURE 2, and any segment may be grasped at both sides thereof and may be drawn vertically upwardly to be released from the remainder of the reproduction. It will be seen that even with the U-shaped member 30 removed from the base 12 the segments 60 of the reproduction are retained in longitudinal alignment by virtue of the guide rail 36 being engaged with the complementary groove 64 extending along the base member 42 of the reproduction 40 as seen in FIGURES 2 and 5. Thus it becomes a relatively simple matter to manipulate the plurality of segments 60 on the base 12 prior to securing the segments in place with the U-shaped member 30 by merely sliding the segments longitudinally along the base, the lateral alignment of the segments being assured by the longitudinal guide rail 36.

Since the base member 42 of the dental reproduction 40 is a precise complementary configuration following the configuration of the interior of the receptacle 38 provided by the dental matrix 10, the individual segments 60 will always be assembled within the matrix in a precise and accurate relationship regardless of the number of times the segments are manipulated or released from the matrix.

The unitary U-shaped member 30 is preferably fabricated of a synthetic resin which is sufficiently resilient to permit movement of the side wall elements 34 with respect to the end wall element 32 between the closed position and the open position as described above by flexing of the U-shaped member 30 at the intersections 80 between the side wall elements 34 and the end wall element 32. The cross-sectional area of the U-shaped member 30 is reduced at the intersections 80 to facilitate the desired flexing of the U-shaped member to move the side wall elements 34 with respect to the end wall element 32. The U-shaped member 30 is preferably molded in one piece with the side wall elements 34 in the open position so that the resilience of the synthetic resin material itself will normally bias the side wall elements toward the open position and the detent means 50 will hold the side wall elements 34 in the closed position against the normal resilient bias provided by the synthetic resin material. While a variety of such synthetic resin materials will become apparent to those skilled in the art of materials, it is preferred to employ a transparent synthetic resin such as, for example, general purpose styrene which will reveal all portions of the reproduction. By thus revealing all portions of the reproduction when the reproduction is secured within the matrix 10, the accuracy of alignment and location of the segments within the matrix may be visually checked. In addition, such materials are relatively inexpensive and yet attractive enough to serve as expendable containers or packages for the convenient shipment or storage of dental reproductions.

Since the dental matrix 10 is economically fabricated of a synthetic resin material, it is easily made in only two pieces. Thus the base 12, the end wall member 24 and the guide rail 36 may be molded in one piece while the U-shaped member 30 is molded in another piece. Such an inexpensive construction allows the dental matrix 10 to be fabricated so inexpensively as to be expendable making it economical to supply every user of dental reproductions with a dental matrix for each reproduction.

It is to be understood that the above detailed description of an embodiment of the invention is provided by way of example only. Various details of design and construction may be modified without departing from the true spirit and scope of the invention.

The embodiments of the invention in which an exclusive property or privilege is claimed are defined as follows:

1. A dental matrix for holding the segments of a segmented reproduction of at least a portion of the jaw in assembled relationship and permitting the selective release of any of the segments of the reproduction from the matrix for the fabrication of dental restorations, said matrix comprising:

a base extending longitudinally between opposite ends and laterally between opposite sides;

an end wall member extending upwardly from said base at one of said opposite ends;

an upstanding guide rail extending longitudinally along the base between the opposite ends of the base and projecting upwardly from the base intermediate the opposite sides of the base for coacting with the segments to align the segments longitudinally along the base;

further wall elements including an upstanding lateral element adjacent the other of said opposite ends of the base and upstanding opposite longitudinal elements extending from the lateral element to the upwardly extending end wall member when the longitudinal elements are secured to the end wall member;

securing means for releasably securing the lateral element of the further wall elements against the base and the longitudinal elements against the upwardly extending end wall member to establish a receptacle within which said reproduction is held, said receptacle having an interior defined by the base, end wall member and further wall elements; and locking means on interior portions of the further wall elements for engaging and coacting with the reproduction to secure the segments thereof against both longitudinal and upward movement;

each of said longitudinal elements of the further wall elements being movable with respect to said lateral element between a closed position wherein said longitudinal elements are secured against the end wall member by the securing means and wherein the locking means engage and coact with the reproduction and an open position wherein said securing means are released and said locking means are brought out of engagement with the reproduction to enable the removal of the further wall elements from the base.

2. The dental matrix of claim 1 wherein the guide rail is tapered in a longitudinal direction so as to assure that each segment is properly seated thereon only in a predetermined desired location.

3. The dental matrix of claim 1 wherein said further wall elements comprises a unitary U-shaped member of a material resilient enough to enable relative movement of the longitudinal elements thereof with respect to the lateral element thereof between the open and closed positions by flexing of the unitary member at the intersection of each longitudinal element with the lateral element.

4. The dental matrix of claim 3 wherein the resilience of the material of the unitary U-shaped member normally biases the longitudinal elements of the U-shaped member toward the open position.

5. The dental matrix of claim 1 wherein the securing means for releasably securing the lateral element of the further wall elements against the base comprises a protuberance projecting longitudinally from the guide rail adjacent the end of the base from which the lateral element of the further wall elements extends and an aperture in said lateral element for receiving the protuberance therein to secure the further wall elements upon the base.

6. The dental matrix of claim 5 wherein the locking means include a plurality of ridges projecting from each said longitudinal element laterally into the interior of the receptacle along the length of the reproduction to engage and coact with the reproduction and preclude movement thereof in a longitudinal direction.

7. The dental matrix of claim 6 wherein the ridges each include:

a forward face adjacent the end wall member, said forward face being inclined at a relatively steep angle with respect to the longitudinal direction; and a rearward face adjacent said lateral element of the further wall elements, said rearward face being inclined at a relatively shallow angle with respect to the longitudinal direction.

8. The dental matrix of claim 6 wherein the locking means include a ledge extending longitudinally along each said longitudinal element and projecting from the longitudinal elements laterally into the interior of the receptacle along the length of the reproduction to provide a platform juxtaposed with the upward extremity of said longitudinal element for supporting corresponding flat support surfaces of the segments and to engage and coact with the reproduction and preclude movement thereof in an upward direction.

References Cited

UNITED STATES PATENTS

| | | | |
|---|---|---|---|
| 2,619,725 | 12/1952 | Roeser | 32—32 |
| 2,621,407 | 12/1952 | Schlesinger | 32—32 |
| 2,911,722 | 11/1959 | Benfield et al. | 32—32 |
| 3,043,009 | 7/1962 | Whitman | 32—32 |

ROBERT PESHOCK, *Primary Examiner.*